United States Patent [19]

Lalancette

[11] 4,098,178

[45] Jul. 4, 1978

[54] WALL TOASTER

[76] Inventor: Lionel Lalancette, 241 de la Bretagne St., Jonquière, Quebec, Canada

[21] Appl. No.: 778,020

[22] Filed: Mar. 16, 1977

[51] Int. Cl.² ............................................. A47J 37/08
[52] U.S. Cl. ................................. 99/329 RT; 99/334; 99/385; 219/444
[58] Field of Search ............. 99/329 R, 329 RT, 331, 99/332, 333, 334, 385; 219/444; 200/61.62

[56] References Cited

U.S. PATENT DOCUMENTS

| | | | |
|---|---|---|---|
| 2,465,577 | 3/1949 | Cox | 99/329 RT |
| 3,205,032 | 9/1965 | Leigh | 99/385 X |
| 3,268,685 | 8/1966 | Swanson | 99/385 X |
| 3,670,642 | 6/1972 | Bergman | 99/329 RT |
| 3,824,915 | 7/1974 | Capucio | 99/329 RT |

*Primary Examiner*—Billy J. Wilhite

[57] ABSTRACT

A toaster adapted for compact mounting and fixing flat against a wall in inoperative position, which has a toasting portion pivotable to an operative position, and wherein the toast is ejected merely by dropping it through an outlet slot in the bottom of the toaster. This wall toaster includes a wall mounting flat portion, a flat toasting portion, a hinge pivotally connecting the toasting portion to the wall mounting portion and producing electric plugging of the toasting portion by operative abutment against the wall mounting portion and a gate is pivotally mounted over the toast outlet slot and operatively opened by an electric operator in response to predetermined toasting of the slice of bread in the toaster.

11 Claims, 8 Drawing Figures

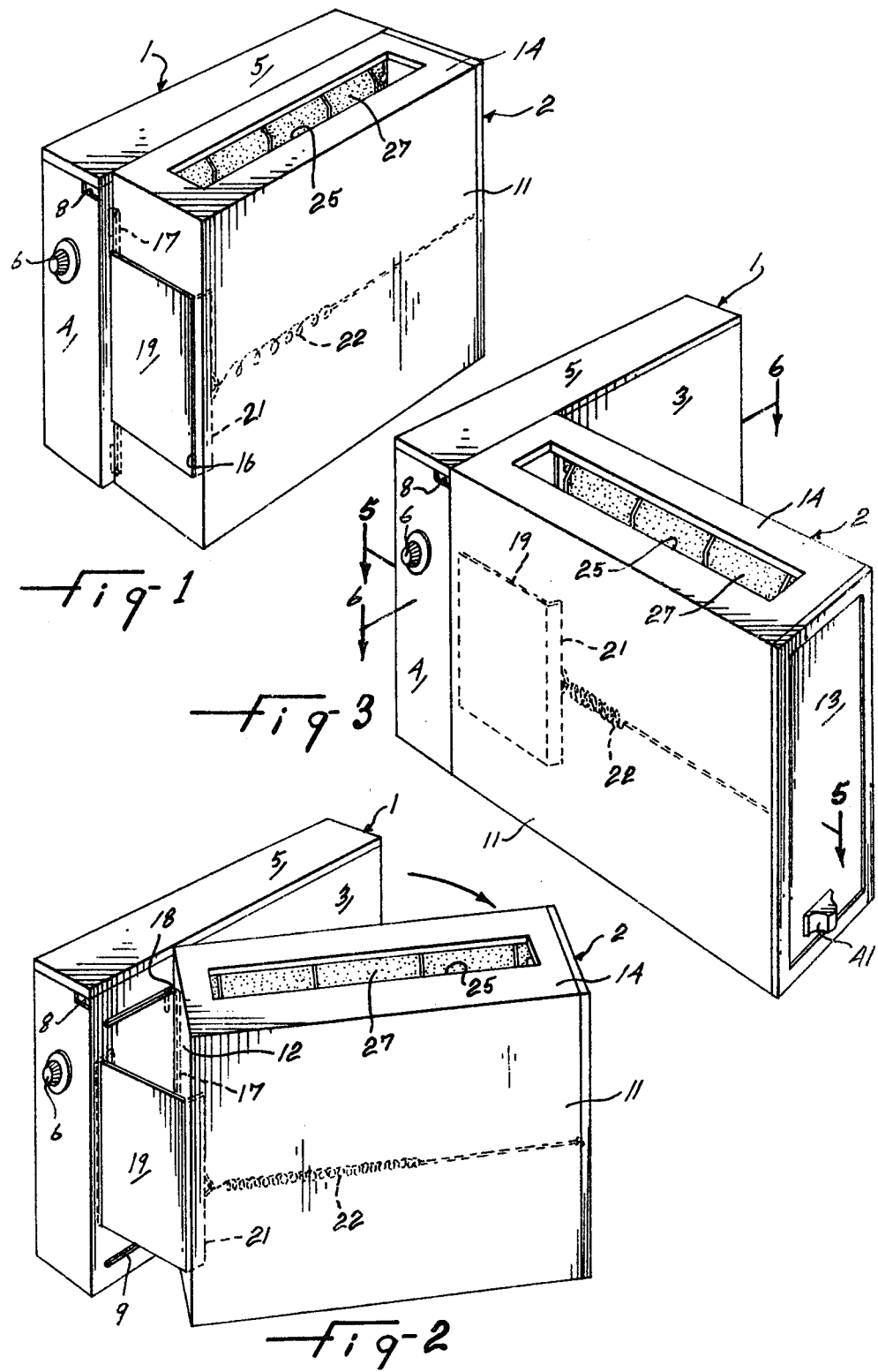

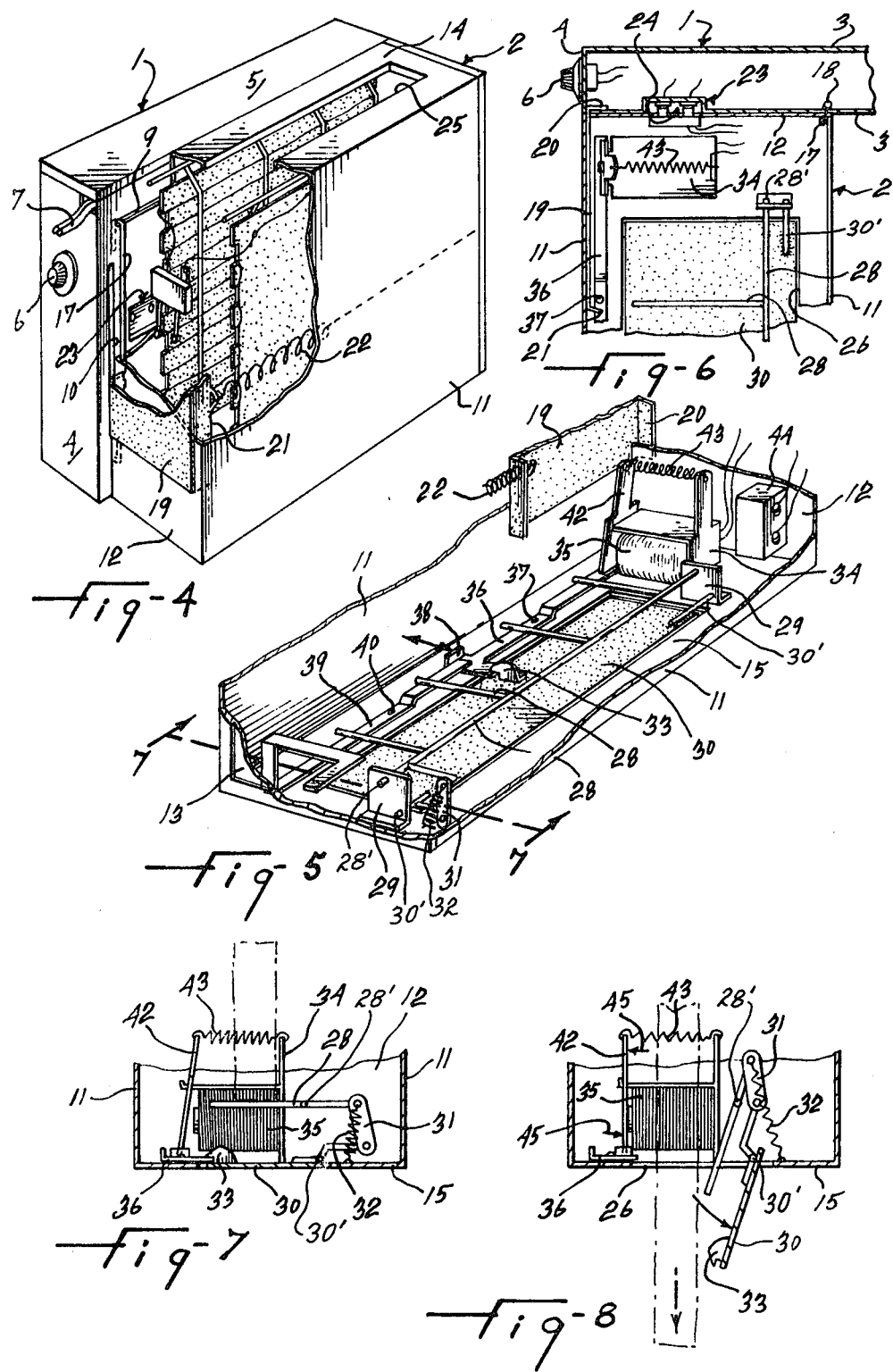

WALL TOASTER

This invention relates to a toaster of the type having at least one slot for a slice of bread or the like.

The toaster of the above type is commonly used on a counter, table, or the like and thus uses substantial horizontal surface which could advantageously be used by something else substantially since the modern kitchen generally has no excess of such horizontal surface. Besides, it is the common practice to put the toaster away when not in use and to put it back on the available horizontal surface each time it is used. It is found annoying to so repeatedly handle the toaster and plug and unplug it.

It is a general object of the present invention to provide a toaster of the above type particularly adapted to be fixed against a wall and be supported by the latter.

It is another object of the present invention to provide a wall toaster which takes advantages of its suspended position to produce a relatively simple mode of ejection of the toasted bread.

It is a more specific object of the present invention to provide a wall toaster which is inoperatively positioned flat against a wall and pivotally opens to an operative toasting position.

It is a further object of the present invention to provide a wall toaster wherein the toast is ejected merely by dropping it through an outlet slot at the bottom of the toaster.

It is a still further object of the present invention to provide a wall toaster having a toasting portion pivoted to a wall mounting portion and electrically plugged by mere operative abutment of the toasting portion in operative toasting position against the wall mounting portion.

The above and other objects and advantages of the present invention will be better understood with reference to a preferred embodiment thereof which is illustrated, by way of example, in the accompanying drawings; in which:

FIG. 1 is a perspective view of a wall toaster according to the present invention and shown in closed inoperative position;

FIG. 2 is a perspective view of the same wall toaster in the process of being opened;

FIG. 3 is a perspective view of the same toaster this time shown in open operative position;

FIG. 4 is a perspective view of the toaster, as in FIG. 1, but with the casing partly broken away to illustrate internal elements;

FIG. 5 is a perspective view of a gate and operating assembly forming part of the illustrated toaster and as seen along line 5—5 in FIG. 3;

FIG. 6 is a plan view of a portion of the gate and actuating assembly as seen along line 6—6 in FIG. 3;

FIG. 7 is a cross-sectional view as seen along line 7—7 in FIG. 5; and

FIG. 8 is a view similar to the view of FIG. 7 but with the gate in released and opened position.

The illustrated wall toaster includes a wall mounting portion 1 and a toasting portion 2. The wall mounting portion 1 includes a flat casing defining a pair of largest rear and front main walls 3, an end wall 4, and an openable cover 5. The wall mounting portion 1 houses an adjustable control to set the desired intensity of toasting. A control knob 6 projects from the end wall 4 and is connected to this conventional toasting control in toaster portion 1 to manually select the desired amount of toasting. An electric plugging cord 7 operatively extends outward through an aperture 8 in the end wall 4 and is connected to the electric circuit and toasting control, in the toaster portion 1.

The front wall 3 of the wall mounting portion 1 is formed with a pair of parallel slots 9. The latter extend endwise transversely and form each a transverse slideway or guideway. An upright or vertical guide slot 10 is formed in the same wall 3 between the transverse slots 9 and adjacent the end wall 4.

The toasting portion 2 of the toaster includes a flat casing defining a pair of largest opposite main walls 11, opposite end walls 12 and 13, a top 14, and a bottom 15. The end wall 12 is formed with a vertical or upright guide slot 16 adjacent one lateral edge thereof. A wire 17 extends upright in the toasting portion 2 adjacent the other lateral edge of the end wall 12. This wire 17 is bent outwardly of the toasting portion 2 to form a pair of external hooks 18. The latter are slidably engaged in the transverse slots 9 respectively. A hinge plate member 19 is slidably engaged in the guide slots 10 and 16 and has laterally bent edge portions 20 and 21 projecting on the same side of the hinge plate member and at the laterally opposite edges respectively of this hinge plate member. The lateral edge portion 20 is engaged in the wall mounting portion 1 while the lateral edge portion 21 is engaged in the toasting portion 2. A spring 22 extends in the toasting portion 2 and is connected to the lateral edge portion 21 to bias the plate member 19 inward relative to the toasting portion and outward relative to the wall mounting portion. Thus, the lateral edge portion 20 forms an abutment against the internal side of the front wall 3 while the lateral edge portion 21 forms an abutment against the end wall 12 when the toasting portion 2 is placed in inoperative or closed position.

The two hooks 18 form a pair of aligned pivot pins defining one pivot axis for the toasting portion 2 while the hinge plate member 19 defines another pivot axis for the toasting portion. The two pivotal connections defined by the plate 19 and the hooks 18 respectively are laterally yieldable to allow displacement of the toasting portion between the inoperative or closed position of FIGS. 1 and 4 and the operative position of FIG. 3. The inoperative position is obtained with the two toaster portions 1 and 2 extending flat against each other; in such case, the plate 19 extends against the end wall 12 and is externally extended relative to the toasting portion. The operative position is obtained when the end wall 12 abuts against the front wall 3 of the wall mounting portion 1; in such case, the hinge plate 19 is retracted inside the toasting portion 2 under the biasing action of the spring 22.

A pair of complementary electric plugging devices 23 and 24 externally project from the front wall 3 and the end wall 12 and are positioned to plug one into the other when the toasting portion 2 is in the operative postion, as shown in FIG. 6. This provides electrical power supply to the electrical elements of the toasting portion automatically upon opening of the latter.

The top 14 of the toasting portion is provided with an inlet slot 25 for an untoasted slice of bread. Similarly, the bottom 15 of the toasting portion is provided with a toast outlet slot 26. These inlet slot and outlet slot extend lengthwise longitudinally of the toasting portion 2 in overlying relationship with each other.

A pair of electric toasting elements 27 of any known construction are mounted in the toasting portion 2 and are separated from each other by a space cooperatively defining with the inlet and outlet slots vertical passage for a slice of bread.

A gate is provided at the bottom of the toasting portion 2 to selectively hold a slice of bread in toasting position between the electric toasting elements 27 and to drop the toast through the toast outlet slot 26 upon completion of the desired toasting of the toast. This gate includes a support member 28 for a slice of bread, A overlying the outlet slot 26 and pivoted at 28' to brackets 29 fixed to the bottom 15. The support member 28 is of light wire construction and is pivoted about an axis extending along one side of the outlet 26. The gate also includes a bottom plate 30 which is complementarily shaped to close the toast outlet slot 26. A pair of pivot pins 30' are fixed to the bottom plate 30 and pivotally engaged in the brackets 29 to define a pivot axis for the bottom plate that extends parallel to the pivot axis of the support member 28 and along the same one side of the toast outlet slot 26. A rigid link 31 is pivotally connected at its opposite ends to the support member 28 and the bottom plate 30 such that the latter two members will concurrently pivot downwardly to release the toast through the outlet slot 26. A spring 32 is connected to the link 31 to upwardly bias the bottom plate 30 and the support member 28 toward the toast supporting portion. A catch 33 is fixed to the bottom plate 30 adjacent the free edge thereof.

A bracket 34 is fixed to the bottom 15 and a solenoid 35 is held by the bracket 34 and extends transversely relative to the toast outlet 26. A latch member 36 is pivoted at 37 on the bottom 15 and operatively projects into latching engagement with the catch 33, as shown in FIGS. 5 and 7. the latch member 36 includes an upward projection 38 adjacent the catch 33.

A manual control lever 39 is pivoted at 40 on the bottom 15, has an inner end laterally engaging the projection 38 of the latch member 36, and has an outer end on which is mounted an activation button 41 outwardly of the end wall 13. It may be readily seen that the bottom plate 30 may be manually unlatched by moving the button 41 to the right such that the manual unlatching lever 39 laterally displaces the projection 38, and frees the catch 33.

An actuating arm 42 is pivoted to the bracket 34 and to the latch member 36, in registry with the solenoid 35. A spring 43 connects the actuating arm 42 to the bracket 34 and biases the actuating arm and the latch member 36 toward latching engagement of the latter with the catch 33.

A thermostatic device 44 is positioned adjacent the electric toasting elements 27 to measure the amount of heat produced by the toasting elements, and consequently, the amount of toasting of the slice of bread in the toaster. The thermostatic device 44 is of any conventional or known construction and is connected to the solenoid 35 and to the toasting elements 27 whereby upon completion of the toasting of one slice of bread, the toasting elements 27 are de-energized and the solenoid is energized. The solenoid 35 then pivots the actuation arm 42 in the direction of the arrows 45 thus producing pivoting of the latch member 36 away from latching engagement with the catch 33. The weight of toast A on support member 28 causes downward pivoting of the latter and opening of bottom plate 30 against the closing action of spring 32 to downwardly eject the toast A. Once the toast A has been ejected, the spring 32 upwardly returns the bottom plate 30 and support member 28. Upon deenergization of solenoid 35, the spring 43 returns the latch member 36 to latching engagement with the catch 33.

What I claim is:

1. A wall toaster comprising a wall mounting portion, a toasting portion, hinge means pivotally connecting said toasting portion to said wall mounting portion, said toasting portion including a relatively flat casing having a top and a bottom, electric toasting elements laterally spaced apart in said casing, said casing having a sliced bread slot vertically extending therethrough between said toasting elements and opening at the top and bottom of said casing, a gate selectively closing said slot and positioned at the bottom of said casing, an operator device connected to said gate for producing opening of the latter to allow ejection of a bread slice through the bottom outlet end of said slot, said wall mounting portion comprising a relatively flat body and a pair of flat and opposite and largest side walls, said flat body adapted to be operatively secured with one of said side walls extending flat against a supporting wall, said casing of said toasting portion further including a pair of flat and opposite largest side walls, and an end wall transversely joining said side walls at one end of said casing, and a first and second laterally yielding pivot means pivotally connecting said one end of the casing to said wall mounting portion and operatively pivoting the casing between an inoperative position and an operative position, respectively, defined by lateral engagement of one side wall of the casing against the other side wall of the wall mounting portion and by endwise engagement of said one end wall of the casing against said other side wall of the wall mounting portion.

2. A wall toaster as defined in claim 1, wherein said first laterally yielding pivot means includes a laterally yielding member pivotally connected to said wall mounting portion and to said casing and said second laterally yielding pivot means includes a slideway and pivot means slidable along said slideway transversely to pivot axes defined by the first and second laterally yielding pivot means.

3. A wall toaster as defined in claim 2, wherein said wall mounting portion includes in said other side wall thereof an operatively upright slot and a pair of operatively transverse slots extending parallel to each other laterally of said upright slot, said casing includes in said end wall an operatively upright slot registering with the upright slot of the wall mounting portion upon engagement of the casing in said operative position, said laterally yielding member constitutes a plate member engaged edgewise in said upright slots and pivotable transversely in the latter, and said pivot means includes a pair of pivot pins pivotally and slidably engaged in said transverse slots respectively.

4. A wall toaster as defined in claim 3, wherein said plate member includes a pair of abutment portions laterally projecting from one side of the plate member in predetermined spaced apart relationship relative to each other, said abutment portions are selectively engageable with said other side wall and with said end wall respectively, a spring engages said plate member and outwardly biases the latter into abutment of one abutment portion with said other side wall.

5. A wall toaster as defined in claim 1, wherein a pair of complementary electric contact devices are fixed to said other side wall and to said end wall respectively and electrically engage each other upon engagement of said casing in the operative position.

6. A wall toaster as defined in claim 1, wherein said gate includes a toast support member operatively overlying said outlet end of said slot in a toast supporting position and pivoted to said casing about one pivot axis extending along one side of said outlet end of said slot, said operator device including a latch releasably holding said toast support member in said toast supporting position, and releasing said toast support member upon actuation of said operator device.

7. A wall toaster as defined in claim 6, wherein said latch includes a pivoted latch member, and said operator device includes an electric solenoid selectively pivoting said latch member away from latching engagement with said gate.

8. A wall toaster as defined in claim 7, wherein a manual lever is pivoted adjacent said latch member, engages with the latter, and releases the latch member from said latching engagement upon selective manual activation of the manual lever.

9. A wall toaster as defined in claim 7, wherein said latch includes a pivoted arm engaging said pivoted latch member, a spring is connected to said pivoted arm and biases the latter and said latch member toward said latching engagement, and said solenoid is operatively connected to said pivoted arm to selectively pivot the latter and the latch member away from said latching engagement upon completion of toasting of a slice of bread.

10. A wall toaster as defined in claim 6, wherein said gate includes a bottom plate operatively closing said outlet end of said slot and pivoted relative to said bottom about another pivot axis extending along said one side of the outlet end of said slot, and a link is pivotally connected to said toast support member and to said bottom plate and produces concurrent pivoting thereof.

11. A wall toaster as defined in claim 10, wherein said operator device includes an electric solenoid, and further including a heat-sensitive device positioned adjacent said electric toasting elements, connected to said solenoid and operatively actuating the latter in response to an amount of heat produced by said electric toasting elements, said solenoid, upon being actuated, causing unlatching of said latch whereby the weight of a toast on said toast support member causes pivoting of said toast support member and bottom plate to a slot opening and toast releasing position to allow ejection of a toast, and further including a spring connected to said gate and to said casing and biasing said gate to slot closing position.

* * * * *